(12) United States Patent
Koushik et al.

(10) Patent No.: US 8,429,566 B2
(45) Date of Patent: Apr. 23, 2013

(54) PROGRAMMABLE HVAC CONTROLLER WITH CROSS COLUMN SELECTION ON A TOUCH SCREEN INTERFACE

(75) Inventors: Sreenivas Koushik, Bangalore (IN); Harshavardhana Bhat, Bangalore (IN); Venugopala Kilingar Nadumane, Kasaragod (IN); Utpala Wandhare, Bangalore (IN); Bhavya Krishnappa, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 361 days.

(21) Appl. No.: 12/942,713

(22) Filed: Nov. 9, 2010

(65) Prior Publication Data
US 2012/0116592 A1    May 10, 2012

(51) Int. Cl.
*G06F 3/048*    (2006.01)
*G06F 19/00*    (2011.01)

(52) U.S. Cl.
USPC .......................................... 715/863; 700/276

(58) Field of Classification Search .................. 700/276; 715/863
See application file for complete search history.

(56) References Cited

U.S. PATENT DOCUMENTS

| | | | | |
|---|---|---|---|---|
| 5,414,809 | A * | 5/1995 | Hogan et al. .................. | 715/765 |
| 6,639,611 | B1 | 10/2003 | Leduc | |
| 6,944,818 | B2 | 9/2005 | Newman et al. | |
| 7,114,554 | B2 | 10/2006 | Bergman et al. | |
| 7,142,948 | B2 * | 11/2006 | Metz .............................. | 700/276 |
| 7,216,291 | B2 | 5/2007 | Kim | |
| 7,257,591 | B2 | 8/2007 | Drucker et al. | |
| 7,370,282 | B2 * | 5/2008 | Cary .............................. | 715/772 |
| 7,490,100 | B2 | 2/2009 | Dettinger et al. | |
| 7,587,666 | B2 | 9/2009 | Delvat et al. | |
| 7,636,604 | B2 * | 12/2009 | Bergman et al. ................ | 700/17 |
| 7,694,233 | B1 | 4/2010 | Ording | |
| 8,082,274 | B2 * | 12/2011 | Steinglass et al. ............ | 707/793 |
| 8,244,383 | B2 * | 8/2012 | Bergman et al. ................ | 700/17 |

(Continued)

FOREIGN PATENT DOCUMENTS
WO    2009151443    12/2009

OTHER PUBLICATIONS

Honeywell RTH8500D Touch Screen Programmable Thermostat data sheet, 2004 Honeywell International Inc.*

(Continued)

*Primary Examiner* — Michael D Masinick
(74) *Attorney, Agent, or Firm* — Seager Tufte & Wickhem LLC (57) ABSTRACT

A programmable HVAC controller that include a controller and a touch screen user interface is configured to control one or more pieces of HVAC equipment in accordance with a programmable schedule. In some instances, the controller of the programmable HVAC controller is programmed to define a number of columns on the touch screen display, such that a selected day of the programmable schedule may be visually represented across two or more adjacent columns of the touch screen display, with the selected day of the programmable schedule beginning in a first column and extending across and into a second adjacent column of the touch screen display. The controller may be programmed to monitor the touch screen display and allow a user to set a start time and/or an end time of a time period of the selected day of the programmable schedule by touching the first column and/or the second column of the touch screen display.

20 Claims, 5 Drawing Sheets

U.S. PATENT DOCUMENTS

| | | | |
|---|---|---|---|
| 2004/0033475 A1* | 2/2004 | Mizuma et al. | 434/219 |
| 2004/0262410 A1 | 12/2004 | Hull | |
| 2005/0071875 A1 | 3/2005 | Kempisty | |
| 2005/0222971 A1* | 10/2005 | Cary | 707/1 |
| 2006/0150115 A1 | 7/2006 | Jin et al. | |
| 2007/0067710 A1 | 3/2007 | Clark et al. | |
| 2007/0079230 A1 | 4/2007 | Vignet | |
| 2008/0155462 A1 | 6/2008 | Nilakantan et al. | |
| 2008/0165149 A1 | 7/2008 | Platzer et al. | |
| 2008/0229242 A1 | 9/2008 | Goering | |
| 2009/0150822 A1 | 6/2009 | Miller et al. | |
| 2009/0189915 A1 | 7/2009 | Mercer et al. | |
| 2009/0199124 A1* | 8/2009 | Birch | 715/772 |
| 2009/0262143 A1 | 10/2009 | Kyu et al. | |
| 2011/0106320 A1* | 5/2011 | Hall | 700/284 |

OTHER PUBLICATIONS

"Drag-and-Pop and Drag-and-Pick: techniques for accessing remote screen content on touch- and pen-operated systems", Baudisch et al, Microsoft Research, Drag and Pop Interact, 2003.*

Screen shot from iCal on MAC, 1 page, prior to Nov. 9, 2010.

* cited by examiner

| 00:00 | 04:00 | 08:00 | 12:00 | 16:00 | 20:00 |
| 01:00 | 05:00 | 09:00 | 13:00 | 17:00 | 21:00 |
| 02:00 | 06:00 | 10:00 | 14:00 | 18:00 | 22:00 |
| 03:00 | 07:00 / 07:30 | 11:00 | 15:00 | 19:00 | 23:00 |
| 520 | 521 | 522 | 523 | 524 | 525 |

PROGRAMMABLE HVAC CONTROLLER WITH CROSS COLUMN SELECTION ON A TOUCH SCREEN INTERFACE

TECHNICAL FIELD

The disclosure relates generally to programmable HVAC controllers, and more particularly, to programmable HVAC controllers that include a touch screen user interface.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation. In many cases, such an HVAC controller may include, or have access to, one or more sensors, and may use parameters provided by the one or more sensors to control the one or more HVAC components to achieve desired programmed or set environmental conditions.

An HVAC controller may be equipped with a user interface that allows a user to monitor and adjust environmental conditions as desired. In some instances, the user interface may permit a user to program the controller with a schedule that is determined by the user. For example, the interface may include a routine that permits a user to set the desired temperature at one or more times during a particular day and/or group of days. In many cases, such a programmable schedule may help reduce energy consumption of the HVAC system by changing the setpoint to an energy saving set back temperature during certain times, such as when the building or space is expected to be unoccupied or when the occupants are expected to be sleeping.

Many contemporary HVAC controllers have a user interface that includes a display, such as a liquid crystal display panel. In some instances, a touch screen display may be used.

SUMMARY

The disclosure relates generally to programmable HVAC controllers, and more particularly, to programmable HVAC controllers that include a touch screen user interface.

In one illustrative embodiment, a programmable thermostat is configured to control one or more pieces of HVAC equipment in accordance with a programmable schedule. In some instances, the programmable thermostat may include a housing, a temperature sensor secured relative to the housing, a touch screen display secured relative to the housing, a memory for storing the programmable schedule, and a controller in communication with the memory and the touch screen display. The controller may be programmed to define a number of columns on the touch screen display, such that a selected day of the programmable schedule is, for example, visually represented across two or more adjacent columns of the touch screen display with the selected day of the programmable schedule beginning in a first column and extending down and across into a second adjacent column of the touch screen display. The controller may be programmed to monitor the touch screen display and allow a user to set a start time and/or an end time of a time period of the selected day of the programmable schedule by touching the first column and/or the second column of the touch screen display. This is just one example.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials may be illustrated for the various elements, those skilled in the art will recognize that many of the examples provided have suitable alternatives that may be utilized.

Figure 1:
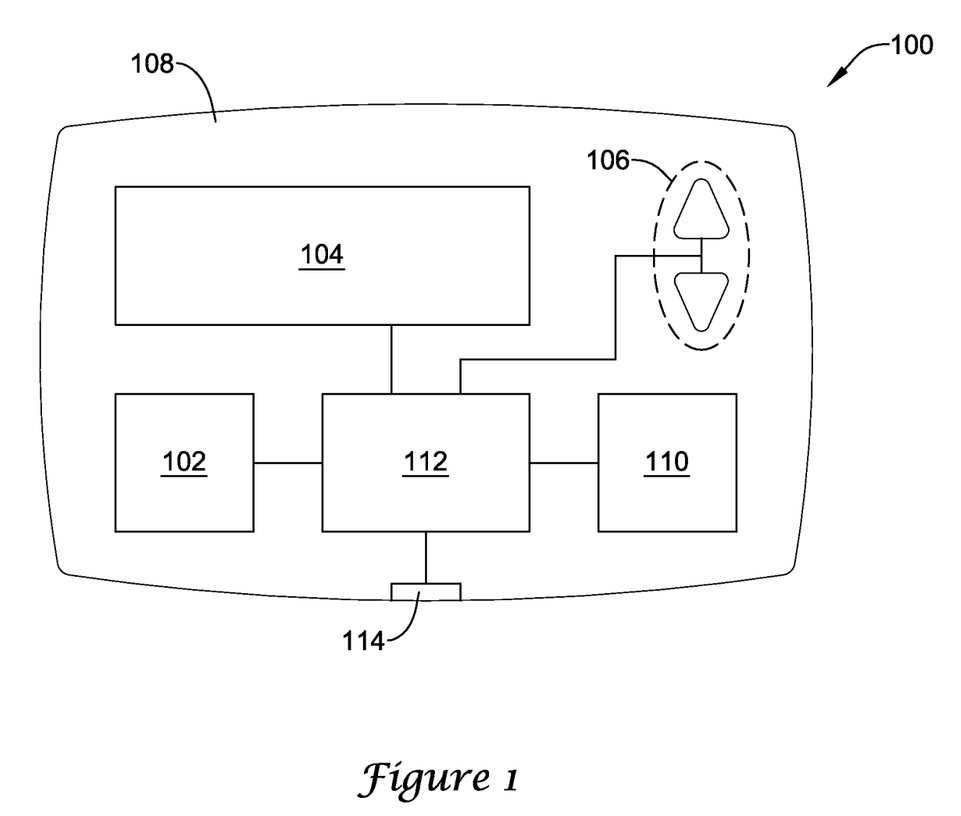
FIG. 1 is a schematic diagram of a programmable HVAC controller having a touch screen display.

FIG. 1 is a schematic diagram of a programmable HVAC controller 100, which may be a programmable thermostat, and which may be configured to control an HVAC system that includes one or more pieces of HVAC equipment. The illustrative HVAC controller 100 may include a memory 102 for storing operational parameters of the HVAC controller 100, which may also be operational parameters of the HVAC system. Such parameters may include, for example, setpoints such as temperature setpoints, schedule periods of a programmable HVAC schedule, etc. HVAC controller 100 may also include a user interface configured to allow a user to modify the operational parameters. The user interface may include a touch screen display 104 and any suitable configuration of buttons, switches, etc. 106 secured relative to a housing 108. The touch screen display 104 may be any suitable touch screen display employing any suitable display technology, such as LCD, OLED, electronic paper, etc., and any suitable touch technology, such as capacitive, resistive, optical, etc. Touch screen display 104 may be configured to provide any appropriate controls, which may supplement and/or replace physical buttons, switches, etc. 106. In some illustrative embodiments, an HVAC controller may present only a touch screen display to a user, and no physical buttons, switches, etc., or it may present only a touch screen display on a user-facing (e.g., front) surface.

The illustrative HVAC controller 100 may include a temperature sensor 110 of any suitable variety, which may be secured relative to housing 108. Temperature sensor 108 may be used for detecting air temperature of the space in which the HVAC controller is disposed. In some instances, the temperature sensor 110 may be located within the housing 108. In other instances, the temperature sensor 110 may be located outside housing 108, or even remotely from HVAC controller 100.

The illustrative HVAC controller 100 may further include a controller or microprocessor 112 operatively coupled to the memory 102, the user interface, and the temperature sensor 110. The controller or microprocessor 112 may be configured or programmed to perform any appropriate steps for controlling the HVAC controller 100, including sending appropriate control signals to the HVAC system. The controller or microprocessor 112 may be configured or programmed to produce, present, and control any and all aspects of the user interface, including but not limited to any user interface elements described in the present disclosure, unless otherwise stated. Other controllers or processors (not shown) may also be employed in HVAC controller 100 to produce/present/control aspects of the user interface. For example, a dedicated driver may be used to serve up information to be displayed on the touch screen display 104, and/or a dedicated processor may be used to interpret touch data from the touch screen display. Regardless, these other controllers or processors may be considered part of the controller or microprocessor block 112 of FIG. 1.

As shown in FIG. 1, controller or microprocessor block 112 may be operatively coupled to an output/interface 114, which may employ any suitable communication technology and protocols to communicate with an HVAC system. In some cases, output/interface 114 may communicate with an HVAC system via, for example, a wired connection or a wireless connection, such as an optical, RF, WiFi, or bluetooth, etc. Such communication may include, for example, commands to activate or deactivate one or more HVAC components of an HVAC system.

The illustrative HVAC controller 100 may maintain in its memory 102 a recurring schedule, which may represent the normal programmable schedule of a programmable thermostat. The schedule may be, for example, a 7 day programmable schedule (where each of the seven days of the week can have a separate daily schedule), a 5-2 programmable schedule (where the five week days have a common schedule, and the two weekend days have a common schedule), or any other schedule as desired. The schedule may have a plurality of time periods, in any suitable arrangement. In some cases, the schedule may have a number of days and one or more time periods for each of at least some of the days. In some instances, the schedule may include a "sleep," a "wake," a "leave," and a "return" time period for each of the days of a week.

In some instances, the touch screen 104 of HVAC controller 100 may be configured to allow manual modification by a user of a schedule. This may include modifying the schedule periods as well as one or more parameters of the HVAC controller 100. In some instances, the user interface may be configured to display some or all of the parameters of the HVAC controller 100 and/or HVAC system. The parameters of the HVAC controller 100 may include, for example, control modes, setpoints, beginning and/or end times of schedule time periods, and the like. It is contemplated that these parameters may be displayed during user programming of the HVAC controller 100 and/or during ongoing system operation, as desired.

Figure 2:
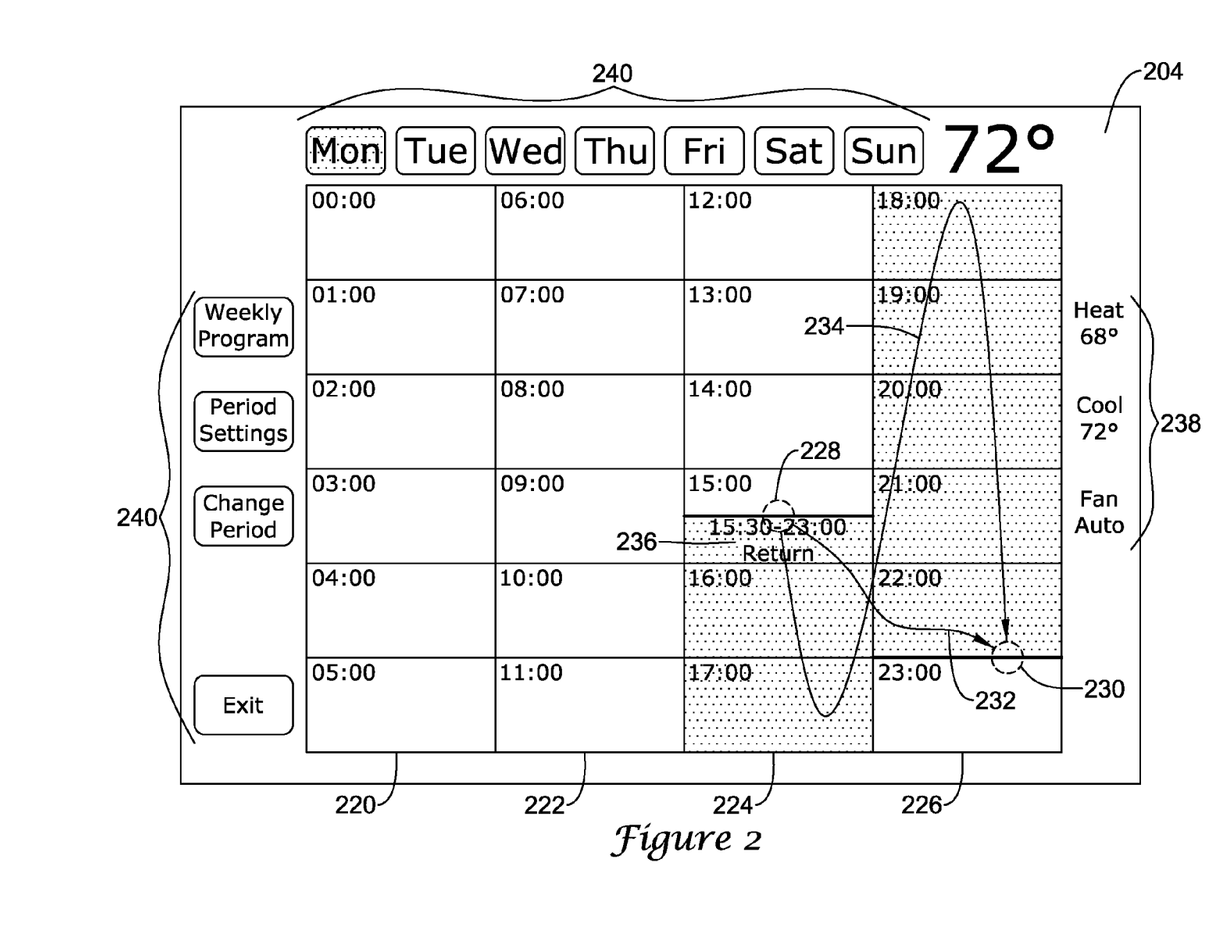
FIG. 2 is a schematic illustration of aspects of a user interface and information layout presented on a touch screen display of an illustrative programmable HVAC controller.

FIG. 2 is a schematic illustration of aspects of a user interface and information layout presented on a touch screen display 204 of an HVAC controller. To produce the information layout of FIG. 2, a controller of an HVAC controller/thermostat (such as HVAC controller 100 of FIG. 1) may be configured or programmed to define a number of columns on the touch screen display 204. The controller may be further configured or programmed to present on the touch screen display 204 a selected day of a programmable schedule that is visually represented across adjacent columns of the touch screen display (in the example of FIG. 2, four adjacent vertical columns), with the selected day of the programmable schedule beginning in column 220 and extending down and across into adjacent columns 222, 224, and 226 of the touch screen display. In some illustrative embodiments, a day may be visually represented across two, three, six, or any other suitable number of columns, as desired. In the example of FIG. 2, columns 220, 222, 224, and 226 are vertical columns, displayed side-by-side horizontally next to each other, but in other illustrative embodiments, the columns may be horizontal columns (sometimes referred-to as rows) arranged side-by-side vertically above and below one another.

In the present disclosure, visually representing a day across multiple columns may include dividing all or part of the entire time interval of a day (e.g., 24 hours) into two or more day sub-portions. For example, and as illustrated in FIG. 2, a selected 24 hour day may be divided into four 6 hour day sub-portions, a first day sub-portion from midnight to 6:00 am (00:00-06:00), a second day sub-portion from 6:00 am to noon (06:00-12:00), a third day sub-portion from noon to 6:00 pm (12:00-18:00), and a fourth day sub-portion from 6:00 pm to midnight (18:00-00:00). These four day sub-portions shown in FIG. 2 may be displayed in adjacent columns of the touch screen display, for example, with the first day sub-portion displayed in column 220, second day sub-portion displayed in column 222, the third day sub-portion displayed in column 224, and the fourth day sub-portion displayed in column 226. As illustrated in FIG. 2, the four day sub-portions are arranged chronologically and contiguously in columns 220, 222, 224, and 226, with the time at the top of a column following contiguously from the time at the bottom of the column immediately to the left. In some embodiments, a right-to-left arrangement may be used rather than the left-to-right arrangement of FIG. 4; similarly, an arrangement with time progressing in the upward, rather than downward direction may be used. Regardless of whether left-to-right, right-to-left, downward, or upward conventions for progression of time are used, a multiple column display of day sub-portions generally may be arranged chronologically and contiguously.

Visually representing a day across multiple columns may allow an entire day to be simultaneously represented in a useful format on a display, without the need for scrolling to allow other parts of the day to be shown in what may be a limited display area. A controller of an HVAC controller/thermostat of the present disclosure may be programmed not to provide a screen scroll function on a touch screen display when visually representing a day across multiple columns of the display. In some instances, a scroll lock may be enacted by a program of the controller, or it may be user selectable. In any event, and in some instances, a controller may be programmed to not provide or display a screen scroll feature or function on the touch screen display when a user is setting (or is allowed to set) a start time and/or an end time of a time period of a day of a programmable schedule.

Figure 3:
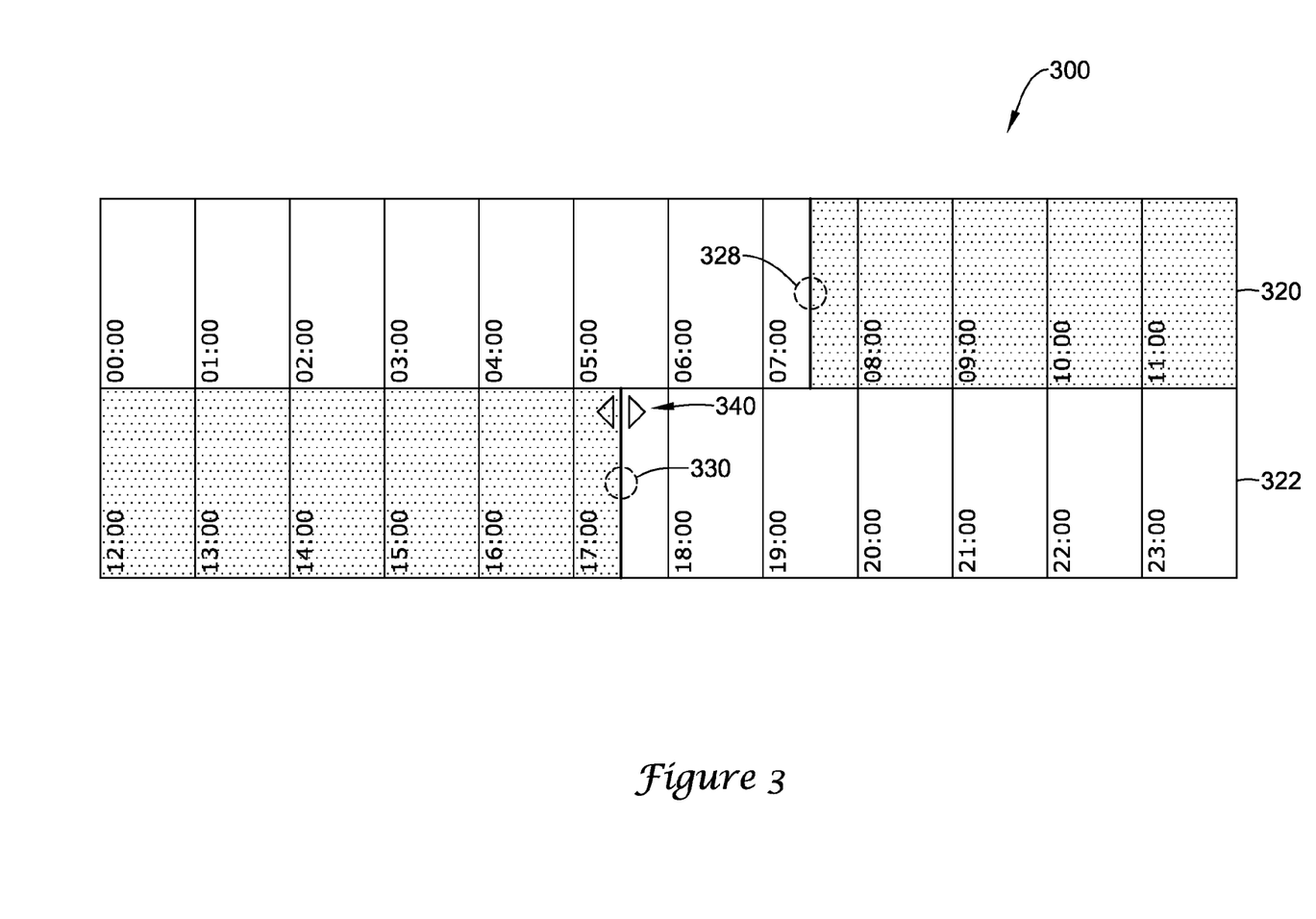
FIG. 3 is a schematic illustration of a visual representation of a day extending across two horizontal columns.
Figure 4:
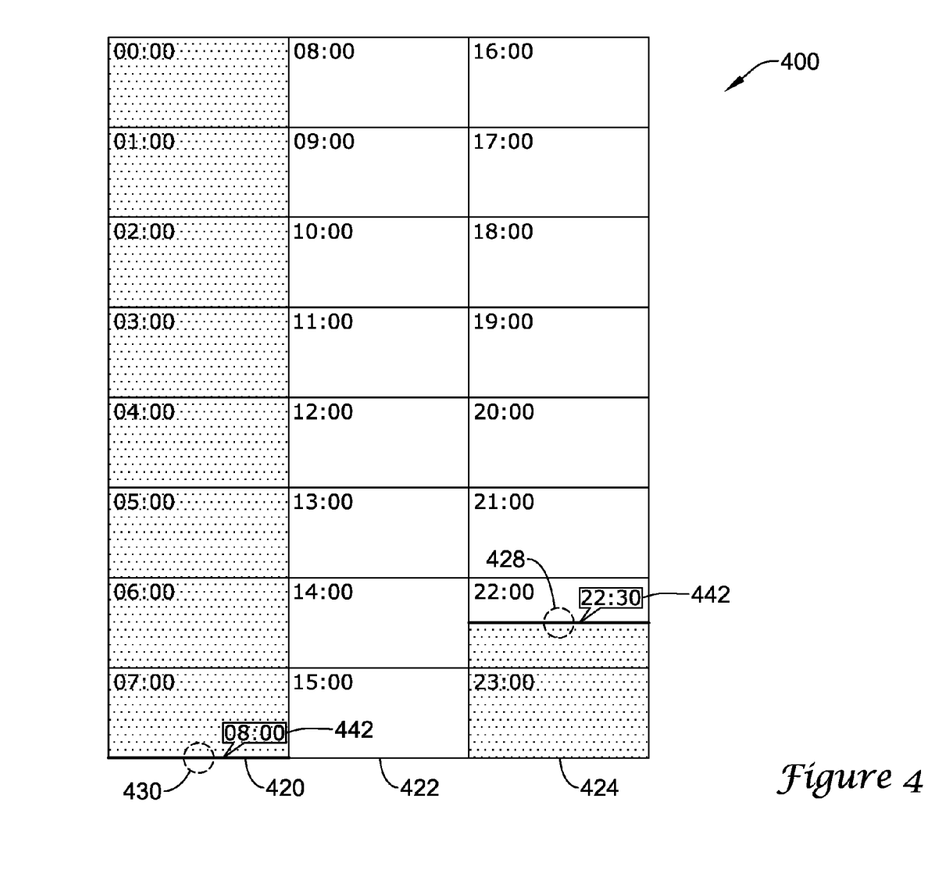
FIG. 4 is a schematic illustration of a visual representation of a day extending across three vertical columns.
Figure 5:
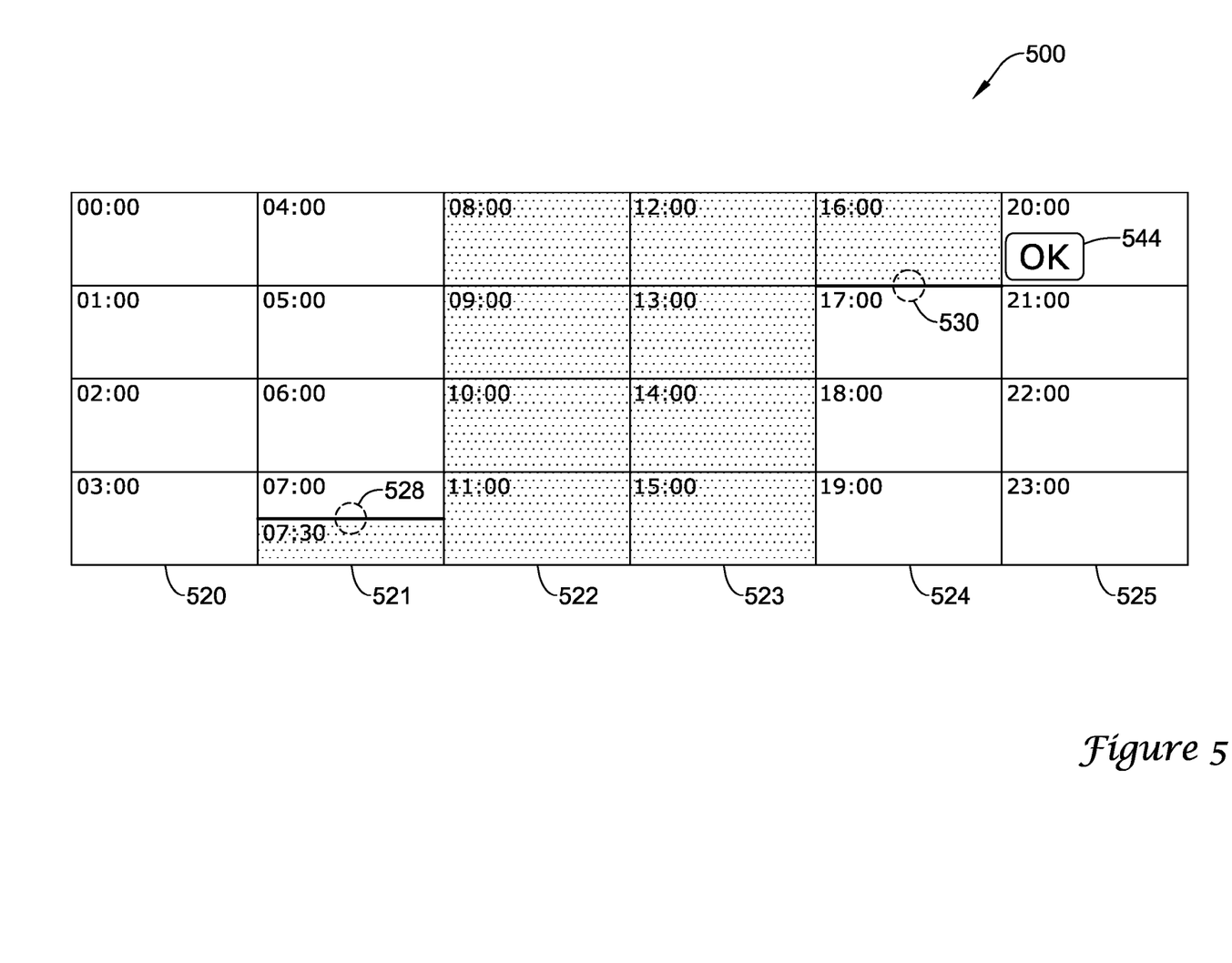
FIG. 5 is a schematic illustration of a visual representation of a day extending across six vertical columns.

In some illustrative embodiments, and as discussed further herein, a day may be divided into two, three, six, or any other suitable number of day sub-portions, which may or may not be of equal durations. Some of these other divisions of a day into sub-portions are illustrated in FIGS. 3, 4, and 5, and discussed in corresponding parts of this written description. In some illustrative embodiments, not all 24 hours of a day are included in the day sub-portions. In one example, a user option may specify that the hours between midnight and 6:00 am not be included and not be displayed. In some illustrative embodiments, the two or more day sub-portions collectively include all of the hours of the selected day to which they correspond. In some illustrative embodiments, day sub-portions displayed across multiple columns may represent sub-portions of different, consecutive days. For example, a 24 hour time interval may dividing into four sub-portions, with three sub-portions from one day (e.g., 06:00-12:00, 12:00-18:00, 18:00-00:00) and one sub-portion from the following day (00:00-06:00).

In further aspects of the user interface and information layout of FIG. 2, the controller of the HVAC controller/thermostat may be programmed to monitor the touch screen display 204 and allow a user to interact with the touch screen display to input and/or modify settings of the HVAC controller, such as control parameters of the programmable schedule. A user may, for example, set a start time and/or an end time of a time period of a selected day of the programmable schedule by touching one or more columns of the touch screen display.

The controller may be programmed to monitor the touch screen display for any suitable method of touching the touch screen display for setting a start and/or an end time. For example, in some illustrative embodiments the user may touch a first column (in this example, column 224) at a first location 228 and a second column (in this example, column 226) at a second location 230. Touching the first column (224) may include touching and releasing the touch screen display at first location 228, which may then define or otherwise establish a first time that may be the start time of a time period (15:30 or 3:30 pm in this example), and touching the second column (226) may include touching and releasing the touch screen display at second location 230, which may then define or otherwise establish a second time that may be the end time of the time period (23:00 or 11:00 pm in this example). After both a start time and an end time have been selected, the controller may be configured to set the time period to extend from the selected start time to the selected end time. However, this is not the only way that the controller may be programmed to monitor the touch screen to allow user selection of start and end times.

In some illustrative embodiments, the controller may be programmed to allow a user to drag a finger from a start time in the first column to an end time in the second column to set the start time and the end time of the time period. Referring again to FIG. 2, a user may touch the touch screen display 204 at first location 228 (which may correspond to the start time of a time period) and then drag across the touch screen display to second location 230 (which may correspond to the end time) after touching the touch screen display at the first location, maintaining contact with the touch screen throughout. The user may then break contact with the touch screen display at the second location 230. The breaking of contact with the touch screen display may define the location of the second location 230. The controller may be programmed to recognize dragging across the touch screen display from the first location 228 to the second location 230 in any appropriate way. In some illustrative embodiments, the particular path taking during the dragging step may not bear on the selection of the first location 228 and the second location 230. In such an arrangement, the controller may be programmed such that only the locations where the screen is touched and the released define the first and second locations. Accordingly, any path may be taken, such as relatively short path 232, path 234, or a path (not shown) where the user drags the point of contact to arbitrary screen locations before releasing from the screen at the second location. In some embodiments, the controller may be programmed such that dragging contact may be required in all blocks of time to be included in a time period. Any appropriate definition for blocks of time may be used. For example, path 234 represents a path in which dragging contact is made in all hour blocks (15:00, 16:00, 17:00, 18:00, 19:00, 20:00, 21:00, and 22:00) between first location 232 and second location 234. In comparison, short path 232 makes contact only in the 15:00 block, the 16:00 block, and the 22:00 block. The controller may be programmed to change the appearance on the touch screen display of blocks of time that have been touched, which may provide a visual cue to a user.

In some illustrative embodiments, a user may touch a touch screen display to set or modify a start or an end time of a time period without necessarily being required by the user interface to set or modify the other time (i.e., end or start). Any suitable user interface method may be used. For example, a controller may be programmed to present a user interface where a user may touch a touch screen display at or near an existing start time of a time period (which may also be an end time of an immediately preceding time period) and modify the existing start time. The controller may be programmed to allow modification of the existing start time in any suitable way. For example, after touching the touch screen display at or near the existing start time, the user may drag the start time to a different location without breaking contact with the screen. Alternately, the user interface may be arranged such that the existing start time is tapped quickly to select it, then touched a second time and dragged to a different location.

During and/or subsequent to setting a start and/or end time of a time period, the controller may be configured to provide information on the touch screen display pertaining to the time period, and/or the start and/or end time of the time period. For example, the controller may be configured to visually distinguish the appearance on the touch screen display of the time period, or of a candidate time period (a time period before selection of start and/or end time periods is complete). In FIG. 2, the time period is schematically shown shaded darker relative to the other parts of the visual representation of the day, but this is merely exemplary; any visual scheme may be used. In some illustrative embodiments, each time period of a day may be given a distinctive visual appearance, with a selected time period being given a particularly distinctive visual appearance. For example, pastel shades may be used for non-selected time periods, and amore highly saturated color used for a selected time period. The controller may be configured to provide text or numeric information, for example, such as the selected start time and the name of the time period, as shown at 236. HVAC control parameters corresponding to the time period may be displayed, as at 238, although this information placement is only exemplary, and other schemes may be used, such as displaying the HVAC control parameters within the boundaries of the time period on the visual representation of the day. Touch screen display virtual buttons 240 may be provided depending on the mode/context in which the HVAC controller is disposed at a given time. These are merely exemplary, and the controller may be configured to provide any appropriate user interface elements in any appropriate manner.

During and/or subsequent to setting a start and/or end time of a time period, the controller may be programmed to allow the user to set one or more of the adjustable control parameter values that are associated with the time period of the selected day of the programmable schedule. Such adjustable control parameter values may include, but are not limited to, temperature or other setpoints, control modes, and the like. Any suitable method(s) may be used to set/adjust control parameters. For example, physical switches/buttons, virtual buttons on the touch screen, and/or soft keys may be used.

FIG. 3 is a schematic illustration of a visual representation 300 of a day across two horizontal columns. Visual representation 300 may be used, for example, as an element of any suitable user interface, such as the user interface illustrated in FIG. 2, where it may replace the representation of a day across four columns. Features illustrated in FIG. 3 may be used in any compatible user interface of the present disclosure. Horizontal columns 320 and 322 of visual representation 300 are columns arranged side-by-side (i.e., column 320 is immediately above column 322). A first day sub-portion from midnight to noon (00:00 to 12:00) is displayed in column 320, and a second day sub-portion from noon to midnight (12:00 to 00:00) is displayed in column 322. In visual representation 300, a time period from a start time 07:30 at first touch location 328 in a first column (320) to end time 17:30 at second touch location 330 in a second column (322) is denoted by a darker appearance. As an example of a possible user interface element, arrows 340 may be displayed at either or both of the start and end times to indicate adjustability of the start or end time.

FIG. 4 is a schematic illustration of a visual representation 400 of a day across three vertical columns. Visual representation 400 may be used, for example, as an element of any suitable user interface, such as the user interface illustrated in FIG. 2, where it may replace the representation of a day across four columns. Features illustrated in FIG. 4 may be used in any compatible user interface of the present disclosure. Vertical columns 420, 422, and 424 of visual representation 400 are columns arranged side-by-side. A first day sub-portion from midnight to 8:00 am (00:00 to 08:00) is displayed in column 420, a second day sub-portion from 8:00 am to 4:00 pm (08:00 to 16:00) is displayed in column 422, and a third day sub-portion from 4:00 pm to midnight (16:00 to 00:00) is displayed in column 424. In visual representation 400, a time period from a start time 23:00 at first touch location 428 in a first column (424) to end time 08:00 at second touch location 430 in a second column (420) is denoted by a darker appearance. As examples of a possible user interface element, labels 442 may be displayed at either or both of the start and end times to indicate the corresponding time.

FIG. 5 is a schematic illustration of a visual representation 500 of a day extending across six vertical columns. Visual representation 500 may be used, for example, as an element of any suitable user interface, such as the user interface illustrated in FIG. 2, where it may replace the representation of a day across four columns. Features illustrated in FIG. 5 may be used in any compatible user interface of the present disclosure. Vertical columns 520, 521, 522, 523, 524, and 525 of visual representation 500 are columns arranged side-by-side. A first day sub-portion from midnight to 4:00 am (00:00 to 04:00) is displayed in column 520, a second day sub-portion from 4:00 am to 8:00 am (04:00 to 08:00) is displayed in column 521, and so on. In visual representation 500, a time period from a start time 07:30 at first touch location 528 in a first column (521) to end time 17:00 at second touch location 530 in a second column (524) is denoted by a darker appearance. As an example of a possible user interface element, button 544 may be displayed so that a user may confirm selection of start and end times for a time period.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A programmable thermostat configured to control one or more pieces of HVAC equipment in accordance with a programmable schedule, the programmable schedule having a number of days and one or more time periods for each of at least some of the days, and wherein one or more adjustable control parameter values are associated with each of the time periods, the programmable thermostat comprising:

a housing;
a temperature sensor secured relative to the housing;
a touch screen display secured relative to the housing;
a memory for storing the programmable schedule;
a controller in communication with the memory and the touch screen display, the controller programmed to define a number of columns on the touch screen display, wherein a selected day of the programmable schedule is visually represented across two or more adjacent columns of the touch screen display with the selected day of the programmable schedule beginning in a first column and extending down and across into a second adjacent column of the touch screen display; and
the controller further programmed to monitor the touch screen display and allow a user to set a start time and/or an end time of a time period of the selected day of the programmable schedule by touching the first column and/or the second column of the touch screen display.

2. The programmable thermostat of claim 1, wherein the controller is programmed to allow a user to drag a finger from a start time in the first column to an end time in the second column to set the start time and the end time of the time period of the selected day of the programmable schedule.

3. The programmable thermostat of claim 1, wherein the controller is programmed to allow a user select a start time in the first column and an end time in the second column, where the time period is then set to extend from the selected start time to the selected end time.

4. The programmable thermostat of claim 1, wherein the controller is programmed to not provide a screen scroll function on the touch screen display when setting the start time and/or the end time of the time period of the selected day of the programmable schedule.

5. The programmable thermostat of claim 1, wherein the controller is programmed to allow the user to set one or more of the adjustable control parameter values that are associated with the time period of the selected day of the programmable schedule.

6. A method for programming at least part of a programmable schedule of an HVAC controller, the HVAC controller having a touch screen display, the programmable schedule of the HVAC controller having a number of days and one or more time periods for each of at least some of the days, the method comprising:

dividing a selected day of the programmable schedule of the HVAC controller into two or more day sub-portions;
displaying the two or more day sub-portions in adjacent columns of the touch screen display, with the selected day having a first day sub-portion displayed in a first column and a second day sub-portion displayed in a second adjacent column of the touch screen display, wherein the second day sub-portion is contiguous with and directly follows the first day sub-portion of the selected day; and allowing a user to set a start time and/or an end time of a time period of the selected day of the programmable schedule by touching the first column and/or the second column of the touch screen display.

7. The method of claim 6, wherein the two or more day sub-portions collectively including all of the hours of the selected day.

8. The method of claim 6, wherein the adjacent columns of the touch screen display are displayed as side-by-side vertical columns.

9. The method of claim 6, wherein the adjacent columns of the touch screen display are displayed as side-by-side horizontal columns.

10. The method of claim 6, wherein the touch screen display does not display a scroll feature when the user is allowed to set the start time and/or the end time of the time period of the selected day.

11. The method of claim 6, wherein the step of dividing the selected day of the programmable schedule of the HVAC controller into two or more day sub-portions includes dividing the selected day into three contiguous day sub-portions of equal durations.

12. The method of claim 6, wherein the step of dividing the selected day of the programmable schedule of the HVAC controller into two or more day sub-portions includes dividing the selected day into four contiguous day sub-portions of equal durations.

13. The method of claim 6, wherein the step of dividing the selected day of the programmable schedule of the HVAC controller into two or more day sub-portions includes dividing the selected day into six contiguous day sub-portions of equal durations.

14. The method of claim 6, further comprising:
visually distinguishing the time period, with a first portion of the time period in the first column and a second portion of the time period extending into the second column.

15. The method of claim 14, wherein the time period falls across more than two of the columns of the touch screen display.

16. The method of claim 6, wherein the step of allowing a user to set the start time and/or the end time of the time period of the selected day of the programmable schedule includes:
touching the touch screen display at a first location corresponding to the start time of the time period of the selected day of the programmable schedule;
dragging across the touch screen display to a second location corresponding to the end time of the time period of the selected day of the programmable schedule after touching the touch screen display at the first location, maintaining contact with the touch screen throughout; and breaking contact with the touch screen display after dragging across the touch screen display to the second location; and
setting the start time to the time on the touch screen display that corresponds to the first location, and setting the end time to the time on the touch screen display that corresponds to the second location.

17. The method of claim 6, wherein the step of allowing a user to set the start time and/or the end time of the time period of the selected day of the programmable schedule includes:
touching and releasing the touch screen display at a first location corresponding to a first time; and
touching and releasing the touch screen display at a second location corresponding to a second time;
setting the start time to the first time and setting the end time to the second time.

18. A programmable HVAC controller configured to control one or more pieces of HVAC equipment in accordance with a programmable schedule, the programmable schedule having a number of days and one or more time periods for each of at least some of the days, and wherein one or more adjustable control parameter values are associated with each of the time periods, the programmable HVAC controller comprising:
a touch screen display;
a memory for storing the programmable schedule;
a controller in communication with the memory and the touch screen display, the controller programmed to define a number of columns on the touch screen display, wherein a selected day of the programmable schedule is visually represented across two or more adjacent columns of the touch screen display with the selected day of the programmable schedule beginning in a first column and extending down and across into a second adjacent column of the touch screen display; and
the controller further programmed to monitor the touch screen display and allow a user to set a start time and/or an end time of a time period of the selected day of the programmable schedule by touching the first column and/or the second column of the touch screen display.

19. The programmable HVAC controller of claim 18, wherein the controller is programmed to allow a user to drag a finger from a start time in the first column and an end time in the second column to set the start time and the end time of the time period of the selected day of the programmable schedule.

20. The programmable HVAC controller of claim 18, wherein the controller is programmed to allow a user select a start time in the first column and an end time in the second column, where the time period is then set to extend from the selected start time to the selected end time.

* * * * *